United States Patent [19]
Hayashi et al.

[11] Patent Number: 5,172,846
[45] Date of Patent: Dec. 22, 1992

[54] BUTTING DEVICE FOR JOINING RUNNING STEEL SHEETS

[75] Inventors: Kanji Hayashi; Ryuichi Ozono; Tohru Takeguchi, all of Hiroshima, Japan

[73] Assignee: Mitsubishi Jukogyo Kabushiki Kaisha, Tokyo, Japan

[21] Appl. No.: 810,871

[22] Filed: Dec. 20, 1991

[30] Foreign Application Priority Data

Dec. 20, 1990 [JP] Japan .......................... 2-411836

[51] Int. Cl.⁵ ............................................... B23K 37/04
[52] U.S. Cl. .................................. 228/5.7; 228/44.3; 228/49.4; 269/43
[58] Field of Search ....................... 228/212, 5.7, 44.3, 228/49.4; 219/79, 161; 269/43

[56] References Cited

U.S. PATENT DOCUMENTS

| 3,632,035 | 1/1972 | Wheeler | 228/5.7 |
| 4,854,493 | 8/1989 | Fujii et al. | 228/5.7 |

FOREIGN PATENT DOCUMENTS

| 0168837 | 1/1986 | European Pat. Off. | 228/44.3 |
| 006823 | 10/1956 | Fed. Rep. of Germany | 228/49.4 |
| 21490 | 1/1987 | Japan | 228/44.3 |
| 1333652 | 10/1973 | United Kingdom | 228/5.7 |

Primary Examiner—Samuel M. Heinrich
Attorney, Agent, or Firm—McAulay Fisher Nissen Goldberg & Kiel

[57] ABSTRACT

The device of this invention is to prevent the buckling of steel sheets and positional discrepancy between steel sheets by grasping and butting the front and rear ends of sheets by means of clamping means on a joining device carrier. For this purpose, a pair of joining device carrier 3 are moved on rails 8 mounted at both sides of rolls 9 for conveying steel. The rear end of the preceding steel sheet 1 and the front end of the following steel sheet 2 are grasped by the clamping means 4 and 5 on the joining device carrier, respectively. The clamping means 5 is moved close to the clamping means 4 by using a movable frame so that the steel sheets 1, 2 are butted together.

5 Claims, 5 Drawing Sheets

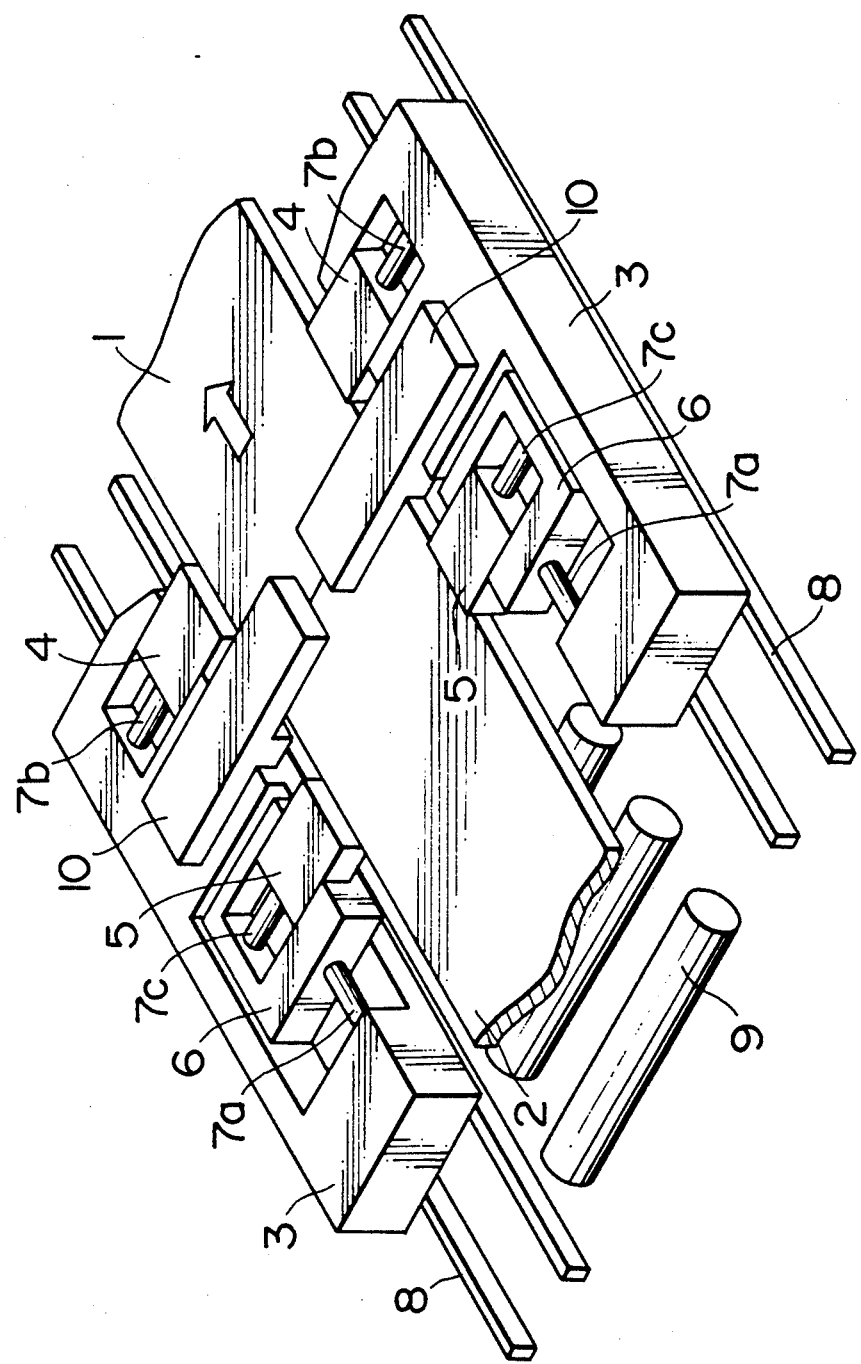

BUTTING DEVICE FOR JOINING RUNNING STEEL SHEETS

FIELD OF THE INVENTION AND RELATED ART STATEMENT

This invention relates to a butting device for joining running steel sheets or plates which can be used on a continuous hot-rolling line constituting steel making machinery.

On the conventional hot-rolling line for rolling steel including steel sheets, steel of a specified length were fed one by one intermittently to a rolling mill to roll the steel. Since steel sheets were fed one by one, a gap was produced between a preceding steel sheet and the following steel sheet. As a result, the rolling mill operated intermittently, leading to low productivity of rolling. Furthermore, the front and rear ends of a steel sheet, having a bad shape, had to be cut off, posing a problem of low yield of product.

Accordingly, as a means for solving these problems, a method has recently been proposed to continuously roll steel by butt-joining the rear end of preceding steel sheet to the front end of following steel sheet. A device for carrying out this joining method is shown in FIG. 5, and its operation is described below. With this method, as shown in FIG. 5, the front end of a following steel sheet 2 is butted to the rear end of a preceding steel sheet 1 inserted between rear-stage rolls 21a, 21b, by using front-stage rolls 20a, 20b, and joined together by using a joining means 22.

In the prior art described above, however, the joining means 22 is positioned between the front-stage rolls 20a, 20b and the rear-stage rolls 21a, 21b, so that a distance of 5 to 10 m is necessary between the front- and rear-stage rolls, which suffers the following disadvantages:

(1) The steel easily buckles, so that a sufficient pressure cannot be applied to the joining surfaces.

(2) It is difficult to fix the steel at a position near the joining surface, so that positional discrepancy easily occurs between the steel sheets.

OBJECT AND SUMMARY OF THE INVENTION

This invention is intended to eliminate these advantages, and it is an object of this invention to provide a butting device for joining running steel sheets which butts running steel sheets together and applies a sufficient pressure to the joining surface.

The butting device for joining running steel sheets according to this invention comprises a sliding member disposed at each side of a conveying means for conveying a plurality of steel sheets continuously, a pair of joining device carriers which are mounted on the sliding member and travel substantially in parallel to the direction in which the steel is conveyed, two sets of clamping means which are mounted on the joining device carrier to clamp the steel sheets, and a moving means which is mounted on the joining device carrier to move one set of the two sets of clamping means substantially in parallel to the direction in which the steel is conveyed so that the preceding and following steel sheets are butted together.

In the device according to this invention, the preceding and following steel sheets are continuously conveyed by the conveying means. A pair of joining device carriers travel on the sliding member following the running steel. A set of clamping means mounted on the pair of joining device carriers clamp the preceding sheet, while another set of clamping means clamp the following sheet, the moving means moves the clamping means so that two sets of the clamping means come close to each other, by which the front end of following sheet is pressed against the rear end of preceding sheet for joining the steel sheets.

BRIEF DESCRIPTION OF THE DRAWINGS

FIG. 3 is a perspective view of still another embodiment of butting device for joining running steel sheets according to this invention.

DETAILED DESCRIPTION OF THE PREFERRED EMBODIMENTS

The embodiments of butting device for joining running steel sheets according to this invention are shown in FIGS. 1 through 4, and they are described with reference to these figures.

Figure 1:
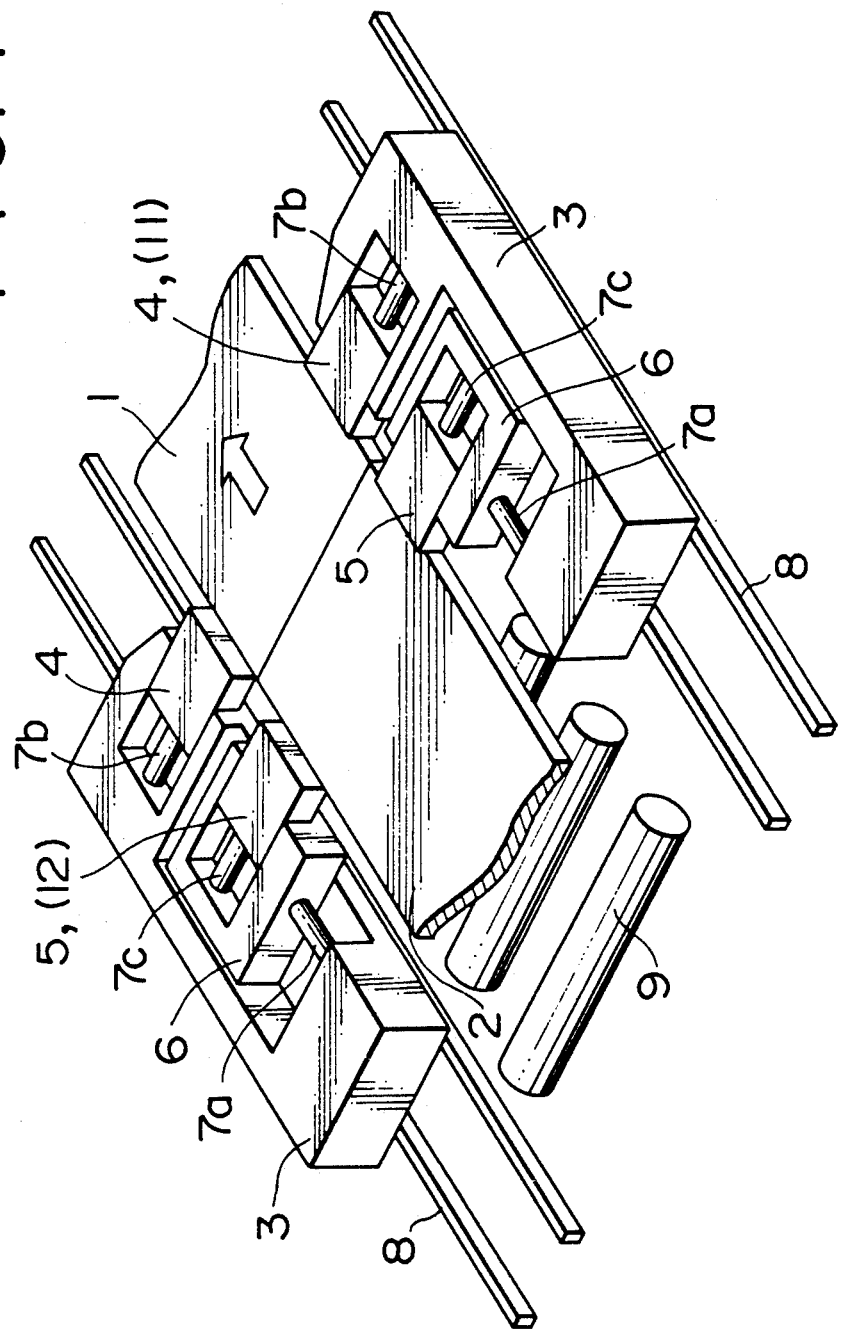
FIG. 1 is a perspective view of an embodiment of butting device for joining running steel sheets according to this invention.

In FIG. 1, reference numeral 9 is a roll for conveying steel sheets. At each side of the roll 9, a sliding member, for example rails 8, is disposed. On the rails 8, a joining device carrier 3 is mounted in such a manner as to travel in the roll direction of steel sheets 1, 2. Each of the joining device carriers 3 has a preceding bar clamping means 4 and a following bar clamping means 5 which is held in a movable frame 6.

The movable frame 6 can be moved within the joining device carrier 3 in the direction in which the joining device carrier 3 travels, via a cylinder rod 7a extending from a cylinder (not shown) incorporated in the joining device carrier 3. The bar clamping means 4, 5 can be moved so as to press the steel sheets 1, 2, via cylinder rods 7b, 7c extending from cylinders (not shown) incorporated in the joining device carrier 3 and the movable frame 6, respectively.

The operation for butting steel sheets by using this embodiment is shown in FIG. 4 and is explained below. A preceding steel sheet 1 moves within the joining device as shown in FIG. 4(a), and when the rear end of preceding steel sheet 1 comes to the position corresponding to the preceding bar clamping means 4 on the joining device carrier 3, the cylinder is operated to slide the cylinder rod 7b as shown in FIG. 4(b). As a result, the pair of preceding bar clamping means 4 grasp the rear end of the preceding steel sheet 1 from both sides, while the pair of joining device carriers 3 travel on the rails 8 following the running preceding steel sheet 1.

Figure 4A:
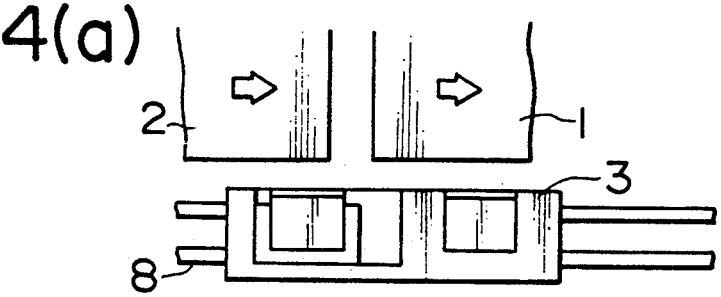
FIG. 4a–4d are schematic views showing the procedure for butting steel sheets by using the butting device for joining running steel sheets according to this invention.
Figure 4B:
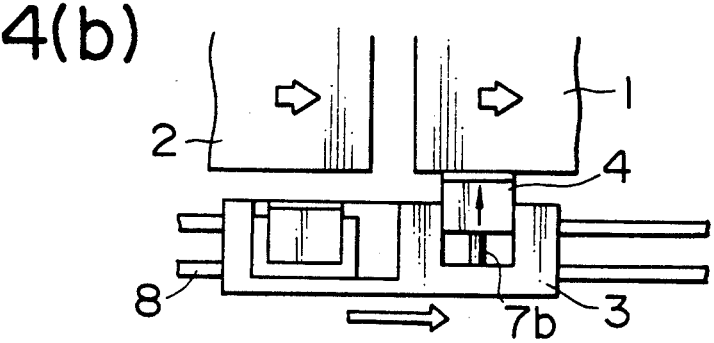
Figure 4C:
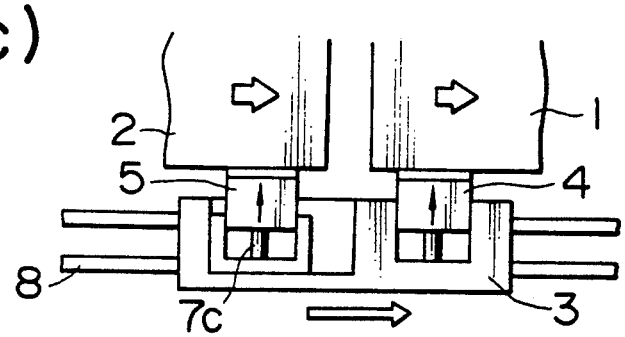
Figure 4D:
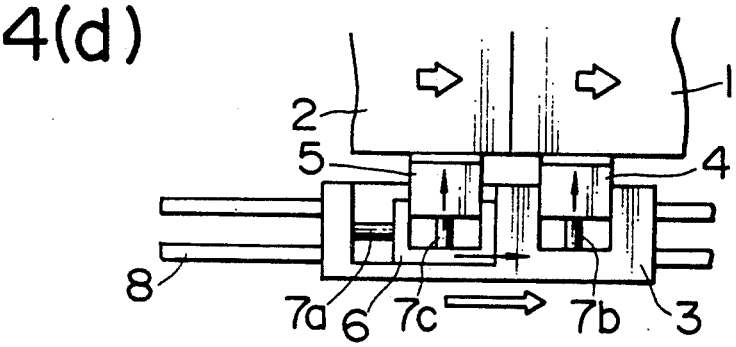
Figure 5:
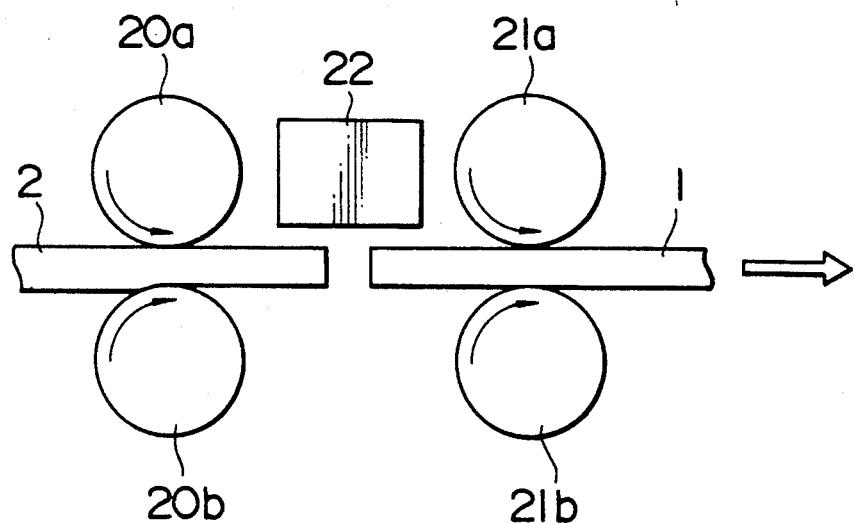
FIG. 5 is a schematic view of the conventional device.

When the following steel sheet 2 moves on the rolls 9 of conveying means and the front end of the following sheet 2 comes close to the rear end of the preceding sheet 1, the cylinder is operated to slide the cylinder rod 7c as shown in FIG. 4(c), so that the pair of following bar clamping means 5 grasp the front end of the following sheet 2.

Then, the cylinder for the cylinder rod 7a is operated to move the movable frame 6 so as to press the front end of the following steel sheet 2 against the rear end of the preceding steel sheet 1. Thus, the preceding steel 1 and the following steel sheet 2 are butted together.

The above-described joining device carrier 3 is self-propelled. As the rear end of the preceding steel sheet comes close to it, the carrier 3 assumes the same speed as the preceding steel sheet. The steel sheet is then clamped by the bar clamping means 4, and the clutch of the carrier 3 becomes disengaged (an off state), so that the carrier is dragged by the steel sheet. When the following steel sheet approaches the preceding sheet, the bar clamping means 5 clamps this following sheet. Next, the cylinder rod 7a moves the movable frame 6 toward the preceding steel sheet so as to butt the front end of the following sheet against the rear end of the preceding sheet.

The above-described rolls 9 may be devised to descend when the joining device carrier 3, being self-propelled, comes close to them and ascend back to the original position after the carrier 3 passes, so that the clamping means, i.e., the bar clamping means 4, 5 do not run into nor come in contact with the rolls 9.

Figure 2:
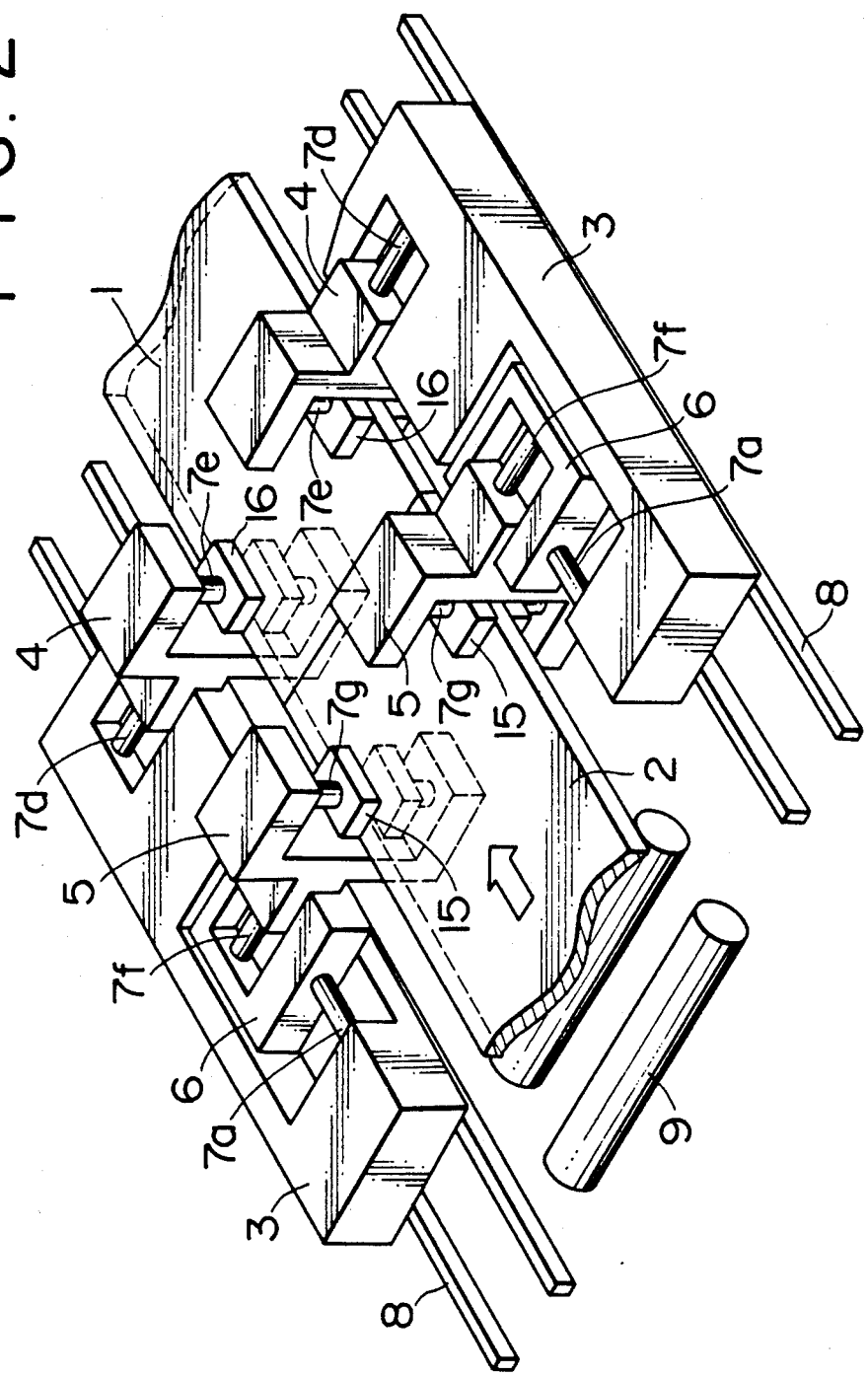
FIG. 2 is a perspective view of another embodiment of butting device for joining running steel sheets according to this invention.

As shown in FIG. 2, cylinder rods 7e, 7g extending from cylinders (not shown) are incorporated in the bar clamping means 4, 5, through which the steel sheets 1, 2 are grasped vertically by clamping plates 15, 16 so that the preceding steel 1 and the following steel sheet 2 can be butted in the same manner as described above. In this embodiment, the bar clamping means 4, 5 can be moved in the direction of steel width via cylinder rods 7d, 7f extending from cylinders (not shown) incorporated in the joining device carrier 3 and movable frame 6, respectively.

For joining steel sheets by using this device described above, a joining method proposed by the applicant of this invention (disclosed in the Japanese patent application Ser. No.75488/1986) or other high-current pressure welding methods can be used. In using such a method, as shown in FIG. 1, the bar clamping means 4, 5 are also used as electrodes 11, 12, so that electric current is directly conducted via these electrodes 11, 12. Also, as shown in FIG. 3, joining means 10 are used on the device when an arc welding method or induction heating method is used, so that the steel sheets 1, 2 are joined.

The device of this embodiment is, as a matter of course, used for entire joining of front and rear ends of steel sheets, and also used for partial joining in the direction of steel width to prepare for pressure welding at the subsequent rolling mill. The device can also be used as a joining device for joining the increased width to pressure-weld the steel sheets with the subsequent rolling mill.

After the joining operation is completed, the joining device carrier 3 is returned to its original position by a driving means (not shown), so that steel sheets conveyed continuously can be joined. A driving means for matching the running speed of steel sheets 1, 2 to the traveling speed of joining device carrier 3 before grasping the steel sheets may be disposed so that the bar clamping means 4, 5 can smoothly grasp the steel sheets 1, 2.

By using the butting device for joining running steel sheets of this invention, the following steel is pressed against the preceding steel sheet by two sets of clamping means incorporated in the joining device carrier which can follow the running steel, which prevents the buckling of steel and relative movement between steel sheets and enables secure butting by applying a pressing force necessary for joining.

We claim:

1. A butting device for joining running steel sheets comprising a sliding member disposed at each side of a conveying means for conveying a plurality of steel sheets continuously, a pair of joining device carriers which are mounted on said sliding member to travel substantially in parallel to the direction in which said steel sheets are conveyed, two sets of clamping means which are mounted on said joining device carrier to clamp said steel sheets, and a moving means which is mounted on said joining device carrier to move one set of said two sets of clamping means substantially in parallel to the direction in which said steel sheets are conveyed so that adjacent steel sheets are butted together.

2. The butting device according to claim 1 wherein said clamping means are bar clamping means for pressing and grasping steel sheets from both sides.

3. The butting device according to claim 1 wherein said clamping means are bar clamping means which grasp steel sheets vertically.

4. The butting device according to claim 1 wherein said clamping means consist of a bar clamping means and an electrode.

5. The butting device according to claim 1 wherein said clamping means further comprise an arc welding or induction heating means.

* * * * *